(12) United States Patent
Shimizu et al.

(10) Patent No.: US 8,270,777 B2
(45) Date of Patent: Sep. 18, 2012

(54) OPTICAL MODULATOR

(75) Inventors: Ryo Shimizu, Chiyoda-ku (JP); Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 258 days.

(21) Appl. No.: 12/734,434

(22) PCT Filed: Oct. 31, 2008

(86) PCT No.: PCT/JP2008/069856
§ 371 (c)(1),
(2), (4) Date: Apr. 30, 2010

(87) PCT Pub. No.: WO2009/057740
PCT Pub. Date: May 7, 2009

(65) Prior Publication Data
US 2010/0296767 A1    Nov. 25, 2010

(30) Foreign Application Priority Data
Nov. 1, 2007   (JP) ................... 2007-284647

(51) Int. Cl.
*G02F 1/035* (2006.01)
(52) U.S. Cl. .......................................................... 385/2
(58) Field of Classification Search .................. None
See application file for complete search history.

(56) References Cited

FOREIGN PATENT DOCUMENTS

| JP | 5-093925 | A | | 4/1993 |
|---|---|---|---|---|
| JP | 9-211403 | A | | 8/1997 |
| JP | 10-096880 | A | | 4/1998 |
| JP | 10096880 | A | * | 4/1998 |
| JP | 2001-004967 | A | | 1/2001 |
| JP | 2002-122834 | A | | 4/2002 |
| JP | 2004-163859 | A | | 6/2004 |
| JP | 3731622 | B | | 1/2006 |
| JP | 2009109929 | A | * | 5/2009 |

* cited by examiner

*Primary Examiner* — Sung Pak
(74) *Attorney, Agent, or Firm* — Chapman and Cutler LLP

(57) ABSTRACT

Provided is an optical modulator wherein frequency characteristics in a high frequency band are further improved and temperature drift phenomenon is more suppressed. The optical modulator is provided with a substrate (1) having electro-optical effects; an optical waveguide (2) formed on the substrate; and a modulation electrode on the substrate. The modulation electrode is composed of a signal electrode for controlling an optical wave guided in the optical waveguide, and ground electrodes (4, 5). A high frequency modulation signal introducing path or a terminator is bonded to at least one of end sections (31, 32) of the signal electrode by bonding (81-86). Dummy electrode sections (131-186) are arranged on the side opposite to the end section of the bonded signal electrode, by having a waveguide path in between.

6 Claims, 2 Drawing Sheets

(a)

(b)

OPTICAL MODULATOR

TECHNICAL FIELD

The present invention relates to an optical modulator, and more particularly, to an optical modulator in which at least any one of a high frequency modulation signal introducing path and a terminator is connected to at least one of end portions of a signal electrode by bonding.

BACKGROUND ART

Recently, in the field of optical communication or optical measurement, optical modulators have been widely used in which an optical waveguide is formed on a substrate having an electro-optic effect and a modulation electrode including a signal electrode and ground electrodes to control an optical wave guided in the optical waveguide is formed on the substrate.

Such optical modulators require various characteristics according to various usages, one of them is frequency dependency of optical response characteristics in a high frequency band over 10 GHz, that is, it is required that frequency characteristics are excellent. However, as shown in FIG. 1, generally, an optical modulator is provided with an input end portion 31 and an output end portion 32 of a signal electrode on the side of a substrate 1, to introduce and propagate a modulation signal to the signal electrode 3, the input end portion 31 is connected to a high frequency modulation signal introducing path 6, and the output end portion 32 is connected to a terminator 7. Accordingly, a part of an introduced high frequency modulation signal is emitted in the substrate to cause a resonant effect, and thus a significant decrease (ripple) in frequency characteristics occurs at a specific frequency in the high frequency band.

In Patent Document 1, to suppress such a problem, jumper conductors 91 and 92 are provided on the opposite side between which the input end portion 31 or the output end portion 32 of the signal electrode and a waveguide 2 are interposed, and the jumper conductors are connected to a metal case 10 housing the optical modulator.

In FIG. 1, Reference Numerals 4 and 5 denote ground electrodes, and Reference Numerals 81 to 86 denote bonded gold ribbons. In FIG. 1, the optical waveguide and the electrode are displayed to overlap with each other in order to facilitate understanding of the positional relation of the optical waveguide and the modulation electrode.

Patent Document 1: Japanese Patent Publication No. 3731622

One of the important characteristics required for optical modulators is suppression of temperature drift. Generally, the signal electrode and the ground electrodes are not linear-symmetric with respect to a center line of an optical waveguide in a propagating direction of light, except for a part of optical modulators. For this reason, the shape of the signal electrode or the ground electrodes is varied by the difference in thermal expansivity of the substrate or the electrodes caused by variation in temperature in the course of the operation of the optical modulator, and thus internal stress affected on the optical waveguide by the electrodes is also varied. As a result, the refractive index of the optical waveguide is varied, and thus a phase of a light wave propagated on the optical waveguide is affected. Therefore, an operation point shift occurs. The operation point shift caused by such variation in temperature is called temperature drift.

In Patent Document 2, to suppress such a problem, as shown in FIG. 2, paying attention to electrodes on optical waveguides 21 and 22 formed on a substrate 1, it is proposed to control the shape of a signal electrode 3 or ground electrodes 4 and 5 so that the electrodes on the optical waveguides are symmetric with respect to the center (chain line A) of the optical waveguide. Specifically, the shape of the ground electrode 4 is divided into a part 41 corresponding to the signal electrode 3 and a part 43 corresponding to the ground electrode 5, and the parts 41 and 43 are electrically connected by a conductive thin film 42.

In FIG. 2, Reference Numeral 11 denotes a buffer layer.

Patent Document 2: Japanese Patent Application Laid-Open No. 2001-4967.

DISCLOSURE OF THE INVENTION

Problem that the Invention is to Solve

An object of the invention is to provide an optical modulator capable of further improving frequency characteristics in the high frequency band and further suppressing the temperature drift phenomenon.

Means for Solving the Problem

The inventor carried out in-depth research. As a result, the inventor found that it is preferable to provide a greater number of jumper conductors shown in FIG. 1 to improve frequency characteristics, but on the other hand discovered that the temperature drift phenomenon tends to become significant. While seeking the cause thereof, the inventor found that internal stress was caused in the optical waveguide by variation in temperature due to the gold ribbons 81 to 86 bonded to the input end portion 31 or the output end portion 32 of the signal electrode, or the jumper conductors 91 and 92, and completed the invention.

According to a first aspect of the invention, there is provided an optical modulator including: a substrate that has an electro-optic effect; an optical waveguide that is formed on the substrate; and a modulation electrode that includes a signal electrode and a ground electrode to control a light wave guided in the optical waveguide and is formed on the substrate, wherein at least any one of a high frequency modulation signal introducing path and a terminator is connected to at least one of end portions of the signal electrode by bonding, and a dummy electrode portion is disposed on the substrate across the waveguide from the end portion of the bonded signal electrode.

In the invention, "dummy electrode portion" means that an electrode with a shape similar to the shape of the signal electrode or the ground electrode at the end portion of the signal electrode is formed at a part of the ground electrode, or even that bonding in the same shape (the same number, the same disposition) as that of the bonding connected to the signal electrode or the ground electrode at the end portion of the signal electrode is applied to a part of the ground electrode, and at least one of these is provided.

According to a second aspect of the invention, in the optical modulator according to the first aspect, the substrate is fixed to a predetermined case, and the dummy electrode portion is bonded to the case.

According to a third aspect of the invention, in the optical modulator according to the second aspect, the bonded position applied to the end portion of the signal electrode and the bonded position applied to the dummy electrode portion are linear-symmetric with the center axis of the light propagating direction in the optical waveguide.

According to a fourth aspect of the invention, in the optical modulator according to any one of the first to third aspects, the dummy electrode portion has a dummy signal electrode and a dummy ground electrode with a shape corresponding to the end portion of the signal electrode and the ground electrode thereabout, and a thin electrode is formed between the dummy signal electrode and the dummy ground electrode.

ADVANTAGE OF THE INVENTION

According to the first aspect of the invention, the optical modulator includes the substrate that has the electro-optic effect, the optical waveguide that is formed on the substrate, the modulation electrode that includes the signal electrode and the ground electrode to control the light wave guided in the optical waveguide and is formed on the substrate, at least any one of the high frequency modulation signal introducing path and the terminator is connected to at least one of the end portions of the signal electrode by bonding, and a dummy electrode portion is disposed on the substrate across the waveguide from the end portion of the bonded signal electrode. Accordingly, the shape of the signal electrode or the ground electrode at the end portion of the signal electrode, or biased internal stress generated by bonding to the high frequency modulation signal introducing path at the end portion of the signal electrode or the terminator can be controlled to be linear-symmetric with the optical waveguide therebetween by internal stress generated by the dummy electrode portions, and thus it is possible to further improve the temperature drift.

According to the second aspect of the invention, the substrate is fixed to the predetermined case, and the dummy electrode portion is bonded to the case. Accordingly, the frequency characteristics can also be improved.

According to the third aspect of the invention, the bonded position applied to the end portion of the signal electrode and the bonded position applied to the dummy electrode portion are linear-symmetric with the center axis of the light propagating direction in the optical waveguide. Accordingly, the internal stress applied to the optical waveguide can be more linear-symmetric, and thus it is possible to further improve the temperature drift.

According to the fourth aspect of the invention, the dummy electrode portion has the dummy signal electrode and the dummy ground electrode with the shape corresponding to the end portion of the signal electrode and the ground electrode thereabout, and the thin electrode is formed between the dummy signal electrode and the dummy ground electrode. Accordingly, the dummy signal electrode and the dummy ground electrode generate appropriate internal stress, and both can serve as an integral ground electrode. Therefore, the temperature drift is suppressed, and the deterioration in frequency characteristics or the like caused by forming a floating electrode is suppressed.

DESCRIPTION OF REFERENCE NUMERALS AND SIGNS

1: SUBSTRATE
2: OPTICAL WAVEGUIDE
3: SIGNAL ELECTRODE
4, 5: GROUND ELECTRODE
31: INPUT END PORTION OF SIGNAL ELECTRODE
32: OUTPUT END PORTION OF SIGNAL ELECTRODE
81 TO 86, 181 TO 186: BONDED CONDUCTOR (GOLD RIBBON)
131, 132: DUMMY SIGNAL ELECTRODE
140: THIN ELECTRODE

BEST MODE FOR CARRYING OUT THE INVENTION

Hereinafter, an optical modulator according to the invention will be described in detail.

The optical modulator according to the invention includes a substrate that has an electro-optic effect, an optical waveguide that is formed on the substrate, and a modulation electrode that includes a signal electrode and a ground electrode to control a light wave guided in the optical waveguide and is formed on the substrate, wherein at least any one of a high frequency modulation signal introducing path and a terminator is connected to at least one of end portions of the signal electrode by bonding, and a dummy electrode portion is disposed on the substrate across the waveguide from the end portion of the bonded signal electrode.

Figure 3:
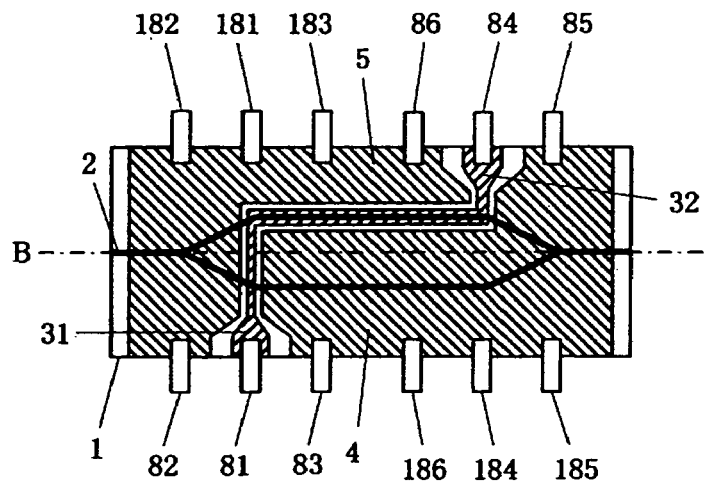
FIG. 3 is a diagram illustrating an optical modulator according to a first embodiment of the invention.

FIG. 3 shows an optical modulator according to a first embodiment of the invention.

A substrate 1 is a substrate formed of a material having an electro-optic effect, for example, lithium niobate, niobium tantalate, lithium tantalate, PLZT (lead lanthanum zirconate titanate), quartz-based material, and combination thereof can be used. Particularly, lithium niobate (LN) or niobium tantalate having a high electro-optic effect can be appropriately used.

A thickness of the used substrate is not particularly limited. However, when the thickness of the substrate is thin, for example, 50 μm or less, it is more significantly and easily subjected to the influence of the shape (including disposition) of the electrode or the internal stress generated by the bonding or the like.

An optical waveguide 2 can be formed by a method of diffusing Ti or the like on the surface of the substrate by a thermal diffusion method, a proton exchange method, or the like.

Figure 1:
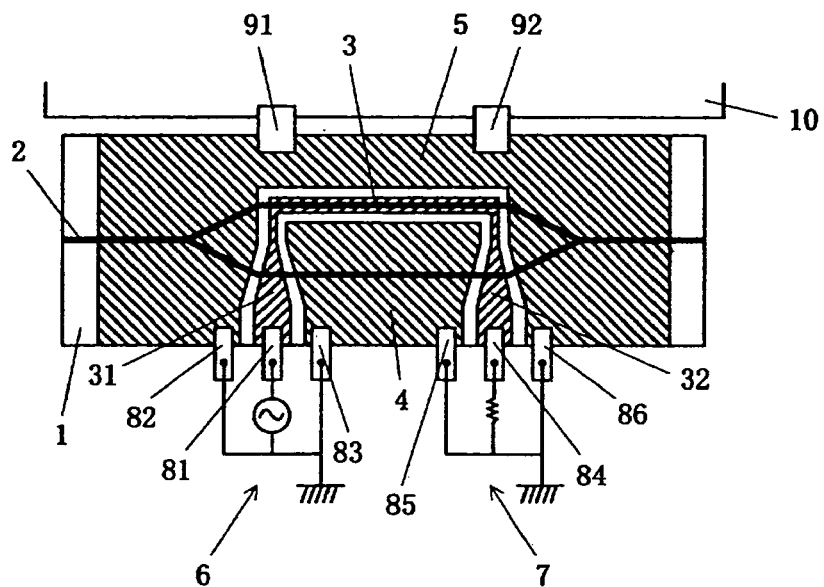
FIG. 1 is a diagram illustrating a known example of an optical modulator for improving frequency characteristics.
Figure 2:
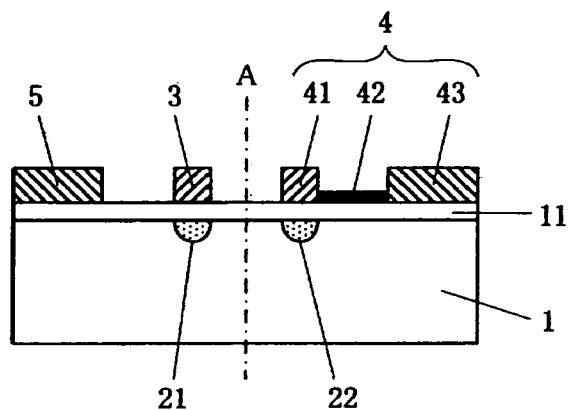
FIG. 2 is a diagram illustrating a known example of an optical modulator for improving temperature drift characteristics.

A modulation electrode can be formed by forming an electrode pattern of Ti.Au, a gold plating method, or the like. As shown in FIG. 2, when the electrodes are disposed right on the optical waveguide, a buffer layer based on $SiO_2$ or the like is formed on the substrate, and the electrodes are formed thereon. Accordingly, it is possible to suppress a light wave propagated in the optical waveguide from being absorbed and diffused by the electrodes.

Next, dummy electrode portions as characteristics of the invention will be described.

In FIG. 3, at the input end portion 31 of the signal electrode, gold ribbons 81 to 83 are connected to the signal electrode 31 and the ground electrodes 4 and 5 by bonding to connect a high frequency modulation signal introducing path.

For this reason, as the dummy electrode portion, the bonding (gold ribbons represented by Reference Numerals 181 to 183) with the same shape (the same number, the same disposition) as that of the signal electrode or the ground electrodes at the input end portion 31 of the signal electrode is applied to a part of the ground electrodes.

The bonding in the invention is not limited to the ribbon-shaped conductors such as the gold ribbons, and may be wire-shaped conductors.

At the output end portion 32 of the signal electrode shown in FIG. 3, gold ribbons 84 to 86 are connected to the signal electrode 32 and the ground electrodes 4 and 5 by bonding to connect a terminator.

For this reason, as the dummy electrode portion, the bonding (gold ribbons represented by Reference Numerals 184 to 186) with the same shape (the same number, the same disposition) as that of the signal electrode or the ground electrodes at the input end portion 32 of the signal electrode is applied to a part of the ground electrodes.

By using such dummy electrode portions, biased internal stress generated by bonding to the high frequency modulation signal introducing path at the end portion of the signal electrode or the terminator can be controlled to be linear-symmetric with the optical waveguide therebetween by internal stress generated by the dummy electrode portions, and thus it is possible to further improve the temperature drift.

The substrate 1 constituting the optical modulator is fixed to a predetermined case (metal case, not shown), the gold ribbons 181 to 186 which are the dummy electrode portions are bonded to the case, and thus it is possible to also improve the frequency characteristics.

The position of the bonding applied to the end portion of the signal electrode and the position of the bonding applied to the dummy electrode portions are linear-symmetric with respect to the center axis (chain line B) of the light propagating direction in the optical waveguide as shown in FIG. 3. Accordingly, the internal stress applied to the optical waveguide can be more linear-symmetric, and thus it is possible to further improve the temperature drift.

Next, an optical modulator according to a second embodiment of the invention will be described.

Figure 4:
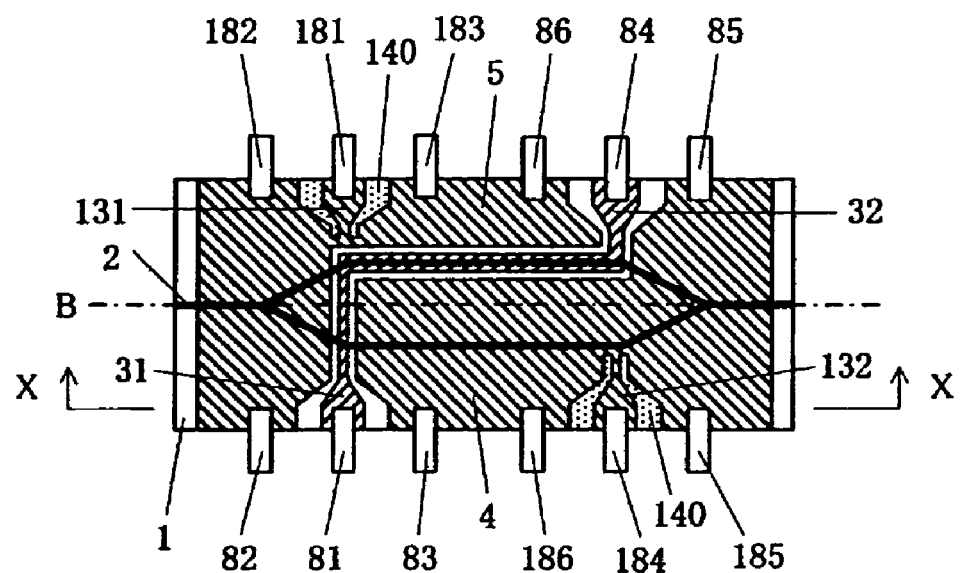
FIG. 4 is a diagram illustrating an optical modulator according to a second embodiment of the invention.
Figure 4:
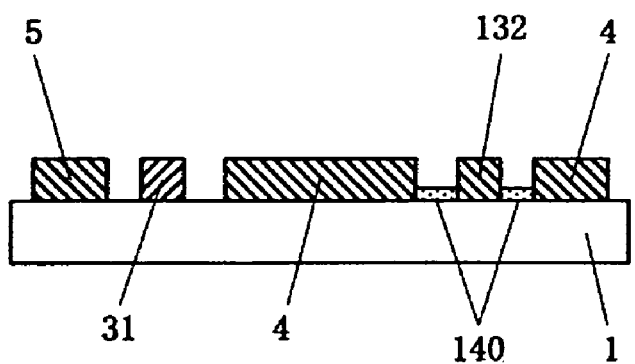

In the second embodiment shown in FIG. 4, the dummy electrode portions are electrodes formed at a part of the ground electrodes in the shape similar to the shape of the signal electrode and the ground electrodes at the end portion of the signal electrode, in addition to the configuration of the first embodiment shown in FIG. 3.

At the dummy electrode portion corresponding to the input end portion 31 of the signal electrode, a dummy signal electrode 131 with a shape corresponding to the end portion 31 of the signal electrode and the ground electrodes 4 and 5 thereabout and a dummy ground electrode (the ground electrode 5 surrounding the dummy signal electrode 131) are provided, and a thin electrode 140 is formed between the dummy signal electrode and the dummy ground electrode.

At the dummy electrode portion corresponding to the output end portion 32 of the signal electrode, a dummy signal electrode 132 with a shape corresponding to the end portion 32 of the signal electrode and the ground electrodes 4 and 5 thereabout and a dummy ground electrode (the ground electrode 4 surrounding the dummy signal electrode 132) are provided, and a thin electrode 140 is formed between the dummy signal electrode and the dummy ground electrode.

FIG. 4(*b*) shows a cross-sectional view taken along the arrows X-X shown in FIG. 4(*a*). The thin electrode 140 is configured thinner than the dummy signal electrode or the dummy ground electrode, and is configured so as not to interfere the internal stress generated by the dummy signal electrode or the dummy ground electrode. The thin electrode 140 is an unnecessary configuration from the viewpoint of suppressing the temperature drift. However, the dummy signal electrode and the dummy ground electrode can serve as an integral ground electrode by providing the thin electrode. Accordingly, it is suppressed that a part of the dummy signal electrode becomes a floating electrode to deteriorate the frequency characteristics.

As a method of forming the thin electrode 140, various methods can be used, for example, there is a method in which the dummy signal electrode or the dummy ground electrode are formed, a part other than the part for forming the thin electrode is masked, and an electrode material is deposited, a method in which an electrode with a uniform thickness is formed as the dummy electrode portion, a part corresponding to the thin electrode is etched by an etching liquid, a laser ion beam, or the like, or, on the contrary, a method in which a thin electrode is first formed, and then a thick electrode is formed.

The optical modulator described herein is an example of a Z-cut LN modulator. However, in the X-cut LN modulator, it is a matter of course that the configuration of the invention can be applied to a case where the buffer layer is provided and a case where no buffer layer is provided.

Industrial Applicability

As described above, it is possible to provide the optical modulator capable of further improving the frequency characteristics in the high frequency band and further suppressing the temperature drift phenomenon.

The invention claimed is:

1. An optical modulator comprising:
   a substrate having an electro-optic effect;
   an optical waveguide formed on the substrate; and
   a modulation electrode comprising a signal electrode and a ground electrode to control a light wave guided in the optical waveguide, said modulation electrode being formed on the substrate,
   wherein at least one of a high frequency modulation signal introducing path and a terminator is connected by bonding to at least one of a plurality of end portions of the signal electrode,
   a dummy electrode portion is disposed on an opposite side of the substrate across the waveguide from the end portion of the bonded signal electrode, and
   the dummy electrode portion comprises a dummy signal electrode and a dummy ground electrode, and said dummy electrode portion has a shape corresponding to the end portion of the signal electode and the ground electrode thereabout.

2. The optical modulator according to claim 1, wherein the substrate is fixed to a case, and the dummy electrode portion is bonded to the case.

3. The optical modulator according to claim 2, wherein a position of the bonded end portion of the signal electrode and a position of the bonded dummy electrode portion are linear-symmetric with a center axis of a light propagating direction in the optical waveguide.

4. The optical modulator according to claim 1, wherein a thin electrode is formed between the dummy signal electrode and the dummy ground electrode.

5. The optical modulator according to claim 2, wherein a thin electrode is formed between the dummy signal electrode and the dummy ground electrode.

6. The optical modulator according to claim 3, wherein a thin electrode is formed between the dummy signal electrode and the dummy ground electrode.

\* \* \* \* \*